United States Patent
Cohen

(10) Patent No.: US 9,218,295 B2
(45) Date of Patent: Dec. 22, 2015

(54) METHODS AND SYSTEMS FOR IMPLEMENTING TIME-LOCKS

(75) Inventor: Uzi Cohen, Shrewsbury, MA (US)

(73) Assignee: CA, Inc., New York, NY (US)

( * ) Notice: Subject to any disclaimer, the term of this patent is extended or adjusted under 35 U.S.C. 154(b) by 722 days.

(21) Appl. No.: 13/549,296

(22) Filed: Jul. 13, 2012

(65) Prior Publication Data

US 2014/0019699 A1  Jan. 16, 2014

(51) Int. Cl.
  *G06F 12/00* (2006.01)
  *G06F 12/14* (2006.01)
  *G06F 9/52* (2006.01)
  *G06F 21/00* (2013.01)
  *G06F 17/30* (2006.01)
  *G06F 3/06* (2006.01)

(52) U.S. Cl.
  CPC ............... *G06F 12/14* (2013.01); *G06F 9/526* (2013.01); *G06F 17/30362* (2013.01); *G06F 21/00* (2013.01); *G06F 3/0622* (2013.01)

(58) Field of Classification Search
  CPC ........................... G06F 9/526; G06F 17/30362
  See application file for complete search history.

(56) References Cited

U.S. PATENT DOCUMENTS

2003/0065896 A1* 4/2003 Krueger ..................... 711/164
2010/0161573 A1* 6/2010 Chan et al. .................. 707/704

OTHER PUBLICATIONS http://search.cpan.org/-ronaldws/LockFile-NetLock-0.29/NetLock.pm; Ronald Schmidt>LockFile-NetLock-0.29>LockFile::NetLock (Module Version: 0.29) 4 pages.

* cited by examiner

*Primary Examiner* — Aimee Li
*Assistant Examiner* — Michael C Kolb
(74) *Attorney, Agent, or Firm* — Baker Botts L.L.P.

(57) ABSTRACT

A computer accesses a storage device. The computer includes a processor and a non-transitory computer-readable storage medium storing computer-readable instructions, when executed by the processor, the computer-readable instructions cause the computer to perform: storing a first time-lock and a second time-lock in the storage device; and, when both the first time-lock and the second time-lock are successfully stored in the storage device by the computer, to obtain an exclusive access privilege during a particular time interval associated with the first time-lock and the second time-lock.

19 Claims, 7 Drawing Sheets

METHODS AND SYSTEMS FOR IMPLEMENTING TIME-LOCKS

BACKGROUND

1. Field of the Disclosure

The present disclosure relates generally to methods and systems for implementing time-locks in a data storage.

2. Description of Related Art

In a network environment, multiple servers may access and utilize a shared storage device. When two servers attempt to access the shared storage device at the same time, conflicts may occur. For example, duplicate reports may be generated for the same operation, or conflicting operations may be implemented by the two servers in the shared storage device. Thus, a mechanism is needed to ensure that only one server has exclusive access to the shared storage device at one time. Nevertheless, if a server having exclusive access to the shared storage device is shut down before the server surrenders its exclusive access to the shared storage device, the shared storage device may be locked up indefinitely, such that other servers cannot gain access to the shared storage device. A time based access may be granted to the server to prevent indefinite locked up of the shared storage device. Nevertheless, time may not be synchronized across the servers. Moreover, even if time synchronization across the servers is achieved, communications among the servers and the shared storage device may cause time delays that make it difficult to ensure the use of the same time across multiple servers and to ensure exclusive access to only one server at a time.

In a library described in http://search.cpan.org/~ronaldws/LockFile-NetLock-0.29/NetLock.pm, a directory name in ftp is used to create a lock to a storage. Nevertheless, after the lock using the directory name is created, the lock must be erased after access to the storage is terminated. When a lock is left behind because its owner is terminated unexpectedly and when two servers attempt to recover the left-behind lock by erasing the left-behind lock to gain access to the storage, the two servers may erase each other's lock, and each of the two servers may assume that it owns the lock for exclusive access to the shared storage device.

BRIEF SUMMARY

The present disclosure may utilize two time-locks to ensure that an exclusive access privilege is granted to one entity during time intervals associated with the two time-locks.

According to one aspect of the disclosure, a computer configured to access a storage device, the computer comprising: a processor; and a non-transitory, computer-readable storage medium storing computer-readable instructions when executed by the processor cause the computer to perform: storing a first time-lock and a second time-lock in the storage device; and when both the first time-lock and the second time-lock are successfully stored in the storage device by the computer, obtaining an exclusive access privilege during a particular time interval associated with the first time-lock and the second time-lock.

According to another aspect of the disclosure, a method for accessing a storage device comprising: storing a first time-lock and a second time-lock in the storage device; when both the first time-lock and the second time-lock are successfully stored in the storage device by the computer, obtaining an exclusive access privilege during a particular time interval associated with the first time-lock and the second time-lock.

According to still another aspect of the disclosure, a computer program product comprising: a computer readable storage medium having computer readable program code embodied therewith, the computer readable program code comprising: computer readable program code to store a first time-lock and a second time-lock in the storage device; and computer readable program code to, when both the first time-lock and the second time-lock are successfully stored in the storage device by the computer, obtaining an exclusive access privilege during a particular time interval associated with the first time-lock and the second time-lock.

Objects, features, and advantages of aspects of the disclosure will be apparent to persons of ordinary skill in the art from the following description of an aspect with reference to the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
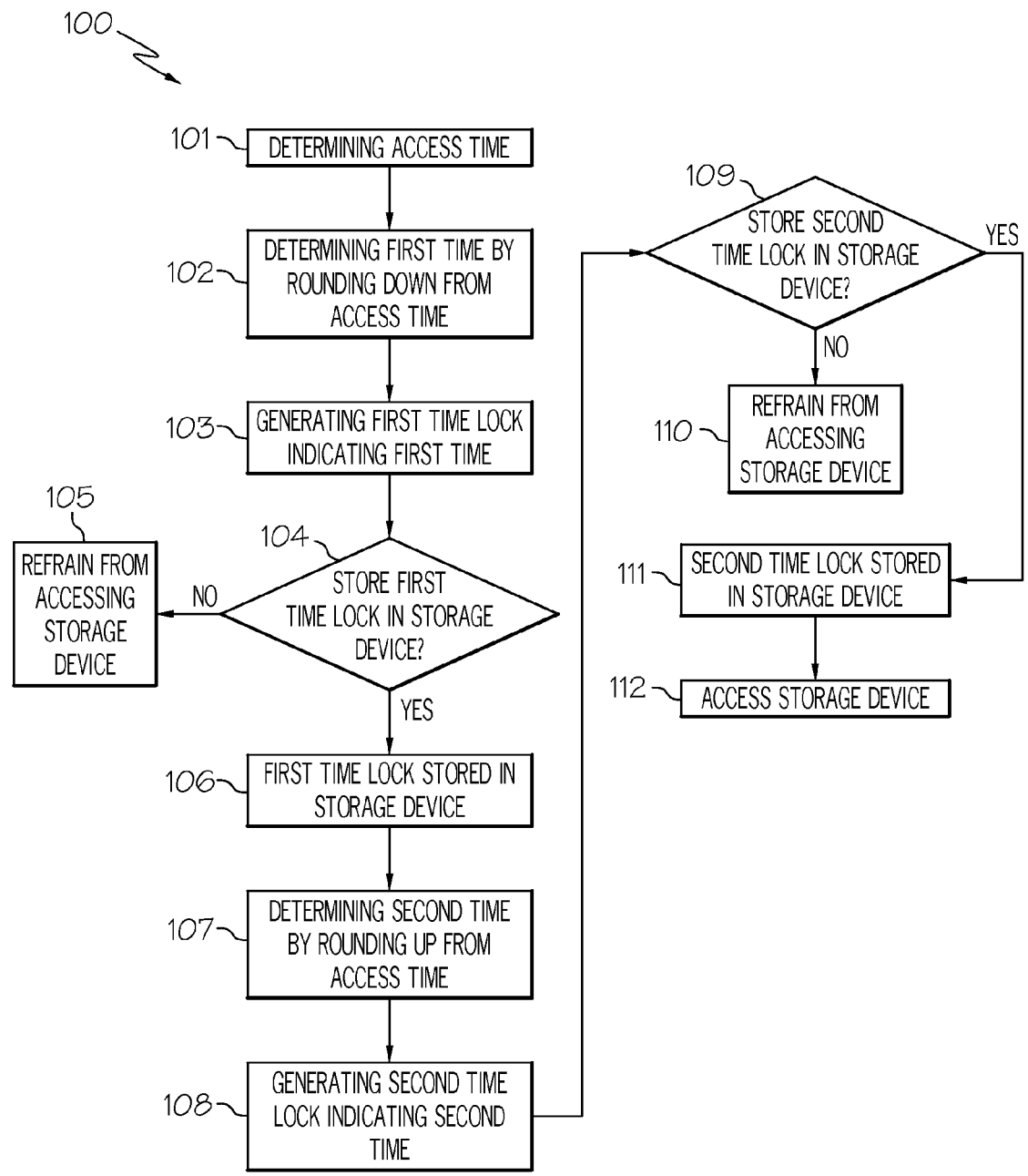
FIG. 1 illustrates a flowchart depicting a process for accessing a shared storage device according to an aspect of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, a storage device access process 100 may be implemented in a computer, e.g., a personal computer, a server, a mobile device, or the like. The computer may execute storage device access process 100 to obtain access to a storage device. In another embodiment, the computer may execute storage device access process 100 to obtain an exclusive access privilege. In particular, the storage device may be shared by a plurality of computers. Each of the plurality of computers may execute storage device access process 100 to obtain exclusive excess to the shared storage device for a predetermined period of time, during which the others of the plurality of computers may not obtain or may be denied access to the shared storage device.

At step 101, the computer may receive instructions to access the storage device. The computer may determine an access time when the computer attempts to connect with the storage device. The access time may be determined based on an internal clock of the computer. In another aspect of the disclosure, the access time may be determined based on an internal clock of the storage device. In yet another aspect of the disclosure, the computer may compare the internal clock of the computer with the internal clock of the storage device and may determine the access time based on a difference, e.g., delta, between the two internal clocks.

At step 102, the computer may determine a first time by rounding down from the access time to obtain a lower limit of a time interval in which the access time is positioned. For example, if the access time is 10:08:16 AM, the computer may round down from 10:08:16 AM to obtain a lower limit of 10:08:00 AM, e.g., round down to increments of a minute. Thus, the time interval is a minute, e.g., 60 seconds. In another aspect, the time interval may be determined based on binary values. Each time internal may be an increment having an upper limit and a lower limit obtained from rounding up or down. For example, the time interval may be set to be 128, i.e., $2^7$, seconds or 256, i.e., $2^8$, seconds. If the time interval is set to 128 seconds, a lower limit of the time interval may be determined by the following rounding down algorithm:

time( )&(~((long)127))

(bitwise AND with (NOT 127) zeros out the first 7 bits).

The time interval may be set based on a degree of time synchronization among computers that share the storage device. In another aspect of the disclosure, the time interval may be set based on an expiration time of the time-locks. At step 103, a first time-lock may be generated from the first time obtained in step 102. For example, the computer may generate a lock object as the first time-lock comprising a name of the first time. In still another aspect of the disclosure, the computer may generate a file or a directory as the first time-lock having a name of the first time.

At step 104, the computer may attempt to store the first time-lock in the storage device. Because the storage device may not allow two objects or files having the same name to be stored in the storage device, the computer may not be allowed to store the first time-lock in the storage device if a time-lock having the same name as the first time-lock already is stored in the storage device by another computer. If a time-lock indicating the first time already is stored in the storage device, the computer may refrain from accessing the storage device at step 105. In another aspect of the disclosure, the storage device may deny access to the computer at step 105.

If a time-lock indicating the first time is not stored in the storage device, the first time-lock, e.g., the object having a name of the first time, from the computer may be stored in the storage device at step 106. At step 107, the computer may determine a second time by rounding up from the access time to obtain an upper limit of the time interval in which the access time is positioned. For example, if the access time is 10:08:16 AM, the computer may round up from 10:08:16 AM to obtain an upper limit of 10:09:00 AM. Thus, the time interval is a minute, i.e., 60 seconds. In another aspect of the disclosure, the time interval may be determined based on binary values. For example, the time interval may be set to be 128, i.e., $2^7$, seconds or 256, i.e., $2^8$, seconds. If the time interval is set to 128, an upper limit of the time interval may be determined by the following rounding up algorithm:

$$(time(\ )>>7)+1)<<7$$

At step 108, a second time-lock may be generated based on the second time obtained in step 102. For example, the computer may generate a lock object as the second time-lock having a name of the second time. In another aspect of the disclosure, the computer may generate a file or a directory as the second time-lock having a name of the second time.

At step 109, the computer may attempt to store the second time-lock in the storage device. Because the storage device may not allow two objects or files having the same name to be stored in the storage device, the computer may not be allowed to store the second time-lock in the storage device if a time-lock having the same name as the second time-lock already is stored in the storage device by another computer. If a time-lock indicating the second time already is stored in the storage device, the computer may refrain from accessing the storage device at step 110. In another aspect of the disclosure, the storage device may deny access to the computer at step 110.

If a time-lock indicating the second time is not stored in the storage device, the second time-lock, e.g., the object having a name of the second time, may be stored in the storage device at step 111. After the first and the second time-locks both are stored in the storage device by the computer, the computer may obtain an exclusive access privilege. For example, the computer may be granted exclusive access to the storage device for a time interval ending with the first time, a time interval starting with the first time, and a time interval starting with the second time at step 112. Referring to Table A, as shown below, for example, if a time interval is set at one minute, e.g., 60 seconds, a first time-lock indicating 10:08:00 and a second time-lock indicating 10:09:00 may allow an exclusive access privilege from 10:07:00 to 10:09:59. Thus, an exclusive access privilege may be granted for a time interval of 60 seconds ending at 10:08:00, a time interval of 60 seconds starting at 10:08:00, and a time interval of 60 seconds starting at 10:09:00.

TABLE A

| First time-lock name (Round down) | Second time-lock name (Round up) | Lock Duration (exclusive access privilege) |
|---|---|---|
| 10:08:00 | 10:09:00 | 10:07:00-10:09:59 |

Access to the storage device may include access to one or more portions of data, e.g., a data table, a specific container, or the like, stored in the storage device or control of operations of the storage device, or both. In another embodiment, the exclusive access privilege may include exclusive access to an operation or another device, such as a printer. In still another embodiment, multiple pairs of time-locks may be implemented in the storage device and each pair of time-locks may grant its owner, e.g., its creator, with an exclusive access privilege to a certain portion of data or a certain functionality of the storage device. For example, two servers may obtain two different exclusive access privileges for two different portions of the storage device. Multiple pairs of time-locks may be implemented for granting various access privileges. The multiple pairs of locks may have unique prefixes to the name of time-locks and may be stored in different portions of the storage device. In yet another embodiment, the exclusive access privilege may grant a server a specific and exclusive role in an operation.

After the time intervals associated with the first time and the second time has elapsed, the computer may surrender access to the storage device. In another aspect of the disclosure, the storage device may deny access to the storage device after the time intervals associated with the first time and the second time has elapsed. The time-locks may be deleted from the storage server after access to the storage device has expired. For example, the server holding the time-locks may delete the time-lock object with the latest time created by the server, along with all other time-lock objects having a time value less than the time-lock with the latest time. The first and the second time-locks may grant exclusive access to the computer for a minimum of one time interval and up to two intervals depending on the access time of the computer. Because a time difference between the internal clocks of computers attempting to acquire time-locks may reduce the total time intervals associated with the two time-locks, the time interval may be set based on the minimum time required for the lock and the maximum possible differences between the internal clocks of the computers. Further, a greater time interval may require greater expiration time if the computer that created the time-locks terminates unexpectedly.

The computer may maintain and extend access to the storage device for an additional time interval associated with the second time and a third time by generating a third time-lock indicating the third time and storing the third time-lock in the storage device. The third time-lock may be generated while the second time-lock is still in effect. In still another aspect of the disclosure, the computer may maintain access to the storage device in a subsequent time interval by generating and storing a keep-alive object in the storage device. The computer may continue to access the storage device by updating the keep-alive object stored in the storage device. Each computer attempting to access the storage device may determine whether the keep-alive object is updated before attempting to store a time-lock in the storage device. If the keep-alive object has been updated to a current time interval, a computer may refrain from accessing the storage device. If the keep-alive object has not been updated to the current time interval, a computer may attempt to acquire time-locks. In yet another aspect of the invention, the time interval of the keep-alive object may be different from the time intervals implemented by time-locks. The storage device and the entities attempting to access the storage device may agree on a length of the time interval of the keep-alive object. For example, if a certain operation occurs every 10 minutes and if the keep-alive object is updated within the 10 minute interval, the other servers may refrain from attempting to acquire time-locks, because the keep-alive object has been updated properly and one of the servers already obtained exclusive privilege to the operation.

Figure 2:
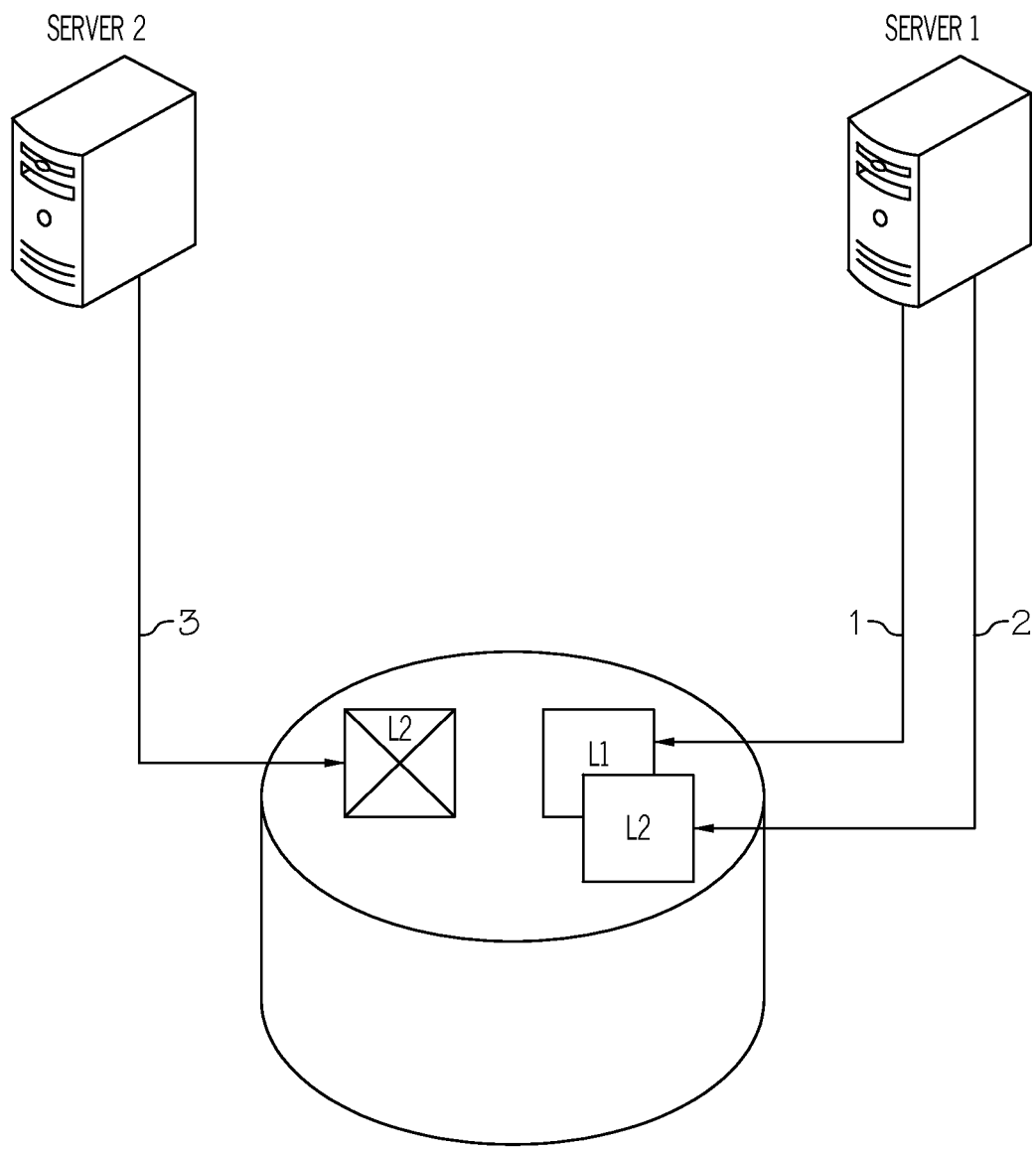
FIG. 2 illustrates a diagram depicting a system for accessing a shared storage device according to an aspect of the disclosure.
Figure 3:
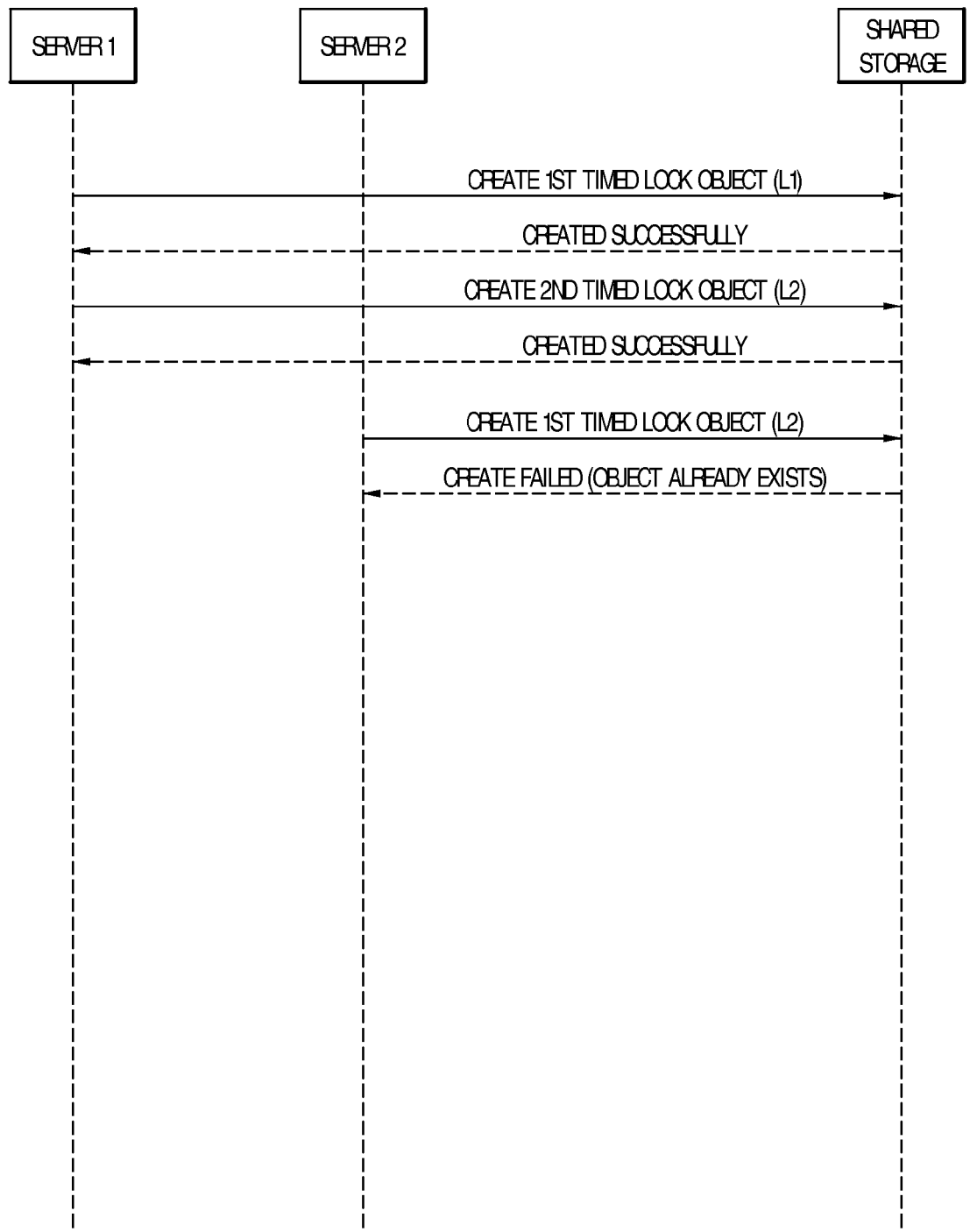
FIG. 3 illustrates a sequence diagram depicting a process for accessing a shared storage device implemented in the system of FIG. 2 according to an aspect of the disclosure.

Referring to FIGS. 2 and 3, storage device access process 100 may be implemented in a system comprising a server 1 and a server 2, sharing a storage device. For example, each of server 1 and server 2 may execute storage device access process 100 to attempt to access the storage device. Referring to FIG. 3, a diagram depicts the operation sequence of server 1, server 2, and the storage device and may correspond to the system, as depicted in FIG. 2.

Server 1 may first attempt to access the storage device by executing storage device access process 100. Server 1 then may obtain a first access time when server 1 begins to attempt to access the storage drive. Server 1 may obtain a first time by rounding down from the first access time to a lower limit of a first time interval in which the first access time occurs. Server 1 next may generate a first time-lock object L1 having a name of the first time. Server 1 may store first time-lock object L1 in the storage device, because no time-lock object having a name of the first time has yet been stored in the storage device. Server 1 may then obtain a second time by rounding up from the first access time to an upper limit of the first time interval in which the first access time occurs. Server 1 next may generate a second time-lock object L2 having a name of the second time. Because no time-lock object having a name of the second time has yet been stored in the storage device, server 1 may store second time-lock object L2 in the storage. Thus, server 1 may gain exclusive access to the storage device during time intervals associated with the first time and the second time.

Server 2 may attempt to access the storage device after server 1 stored the first and second time-lock objects L1 and L2 in the storage device. Server 2 may obtain a second access time when server 2 begins to attempt to access the storage device. The second access time may occur in a second time interval subsequent to the first time interval. Server 2 may round down from the second access time to a lower limit of the second time interval and may generate a third time-lock object having a name of the lower limit of the second time interval. Because the second time interval may be immediately subsequent to the first time interval, the lower limit of the second time interval may be the same as the upper limit of the first time interval. Thus, the third time-lock object generated by server 2 may be identical to second time-lock object L2 of server 1. Because second time-lock object L2 already is stored in the storage device by server 1, server 2 may be prevented from storing the third time-lock object, which may be identical to second time-lock object L2, in the storage device. Therefore, server 2 may be prevented from accessing the storage device. Accordingly, server 1 may have exclusive access to the storage device during time intervals associated with the first and the second time-lock objects L1 and L2. Server 2 may attempt to access the storage device after the first and second time-lock objects L1 and L2 expire.

Figure 4:
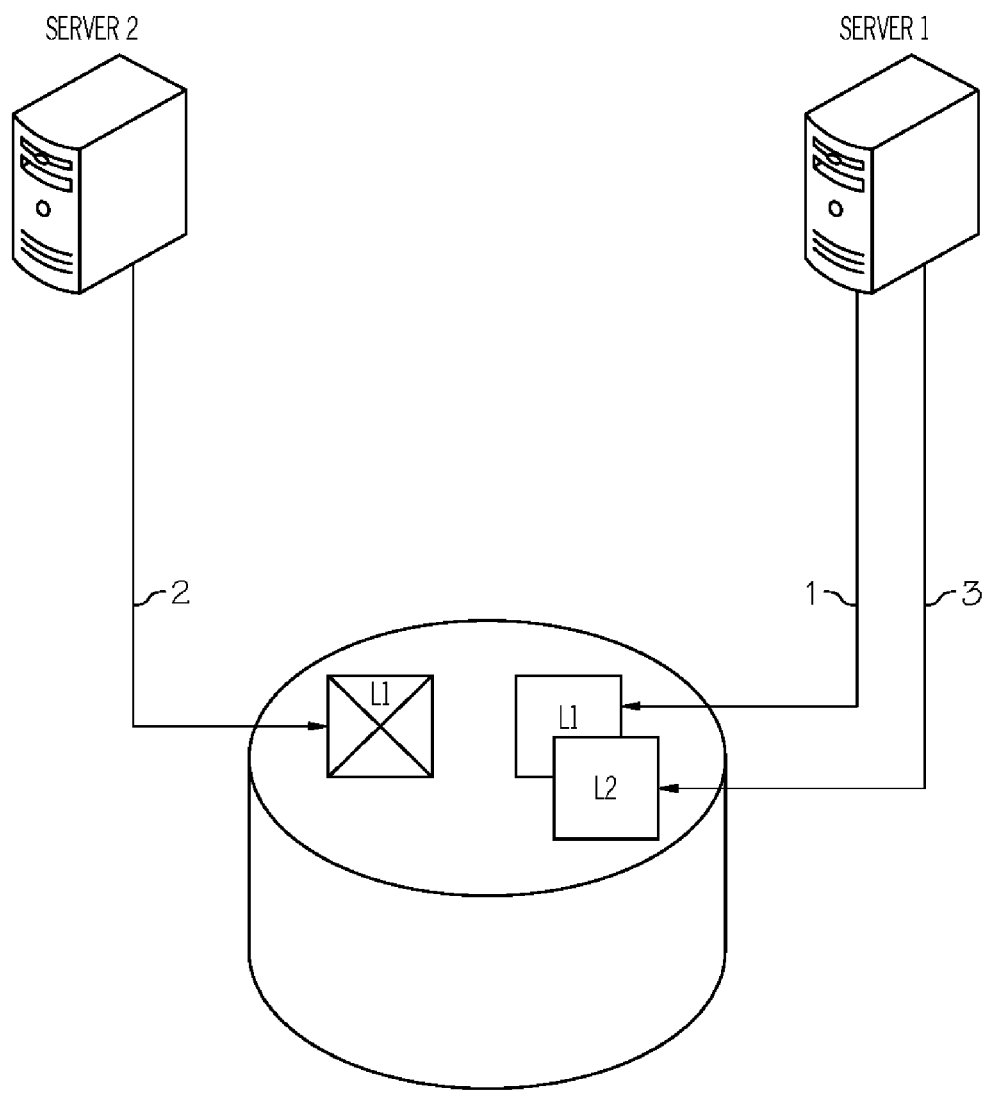
FIG. 4 illustrates another diagram depicting the system for accessing a shared storage device according to an aspect of the disclosure.
Figure 5:
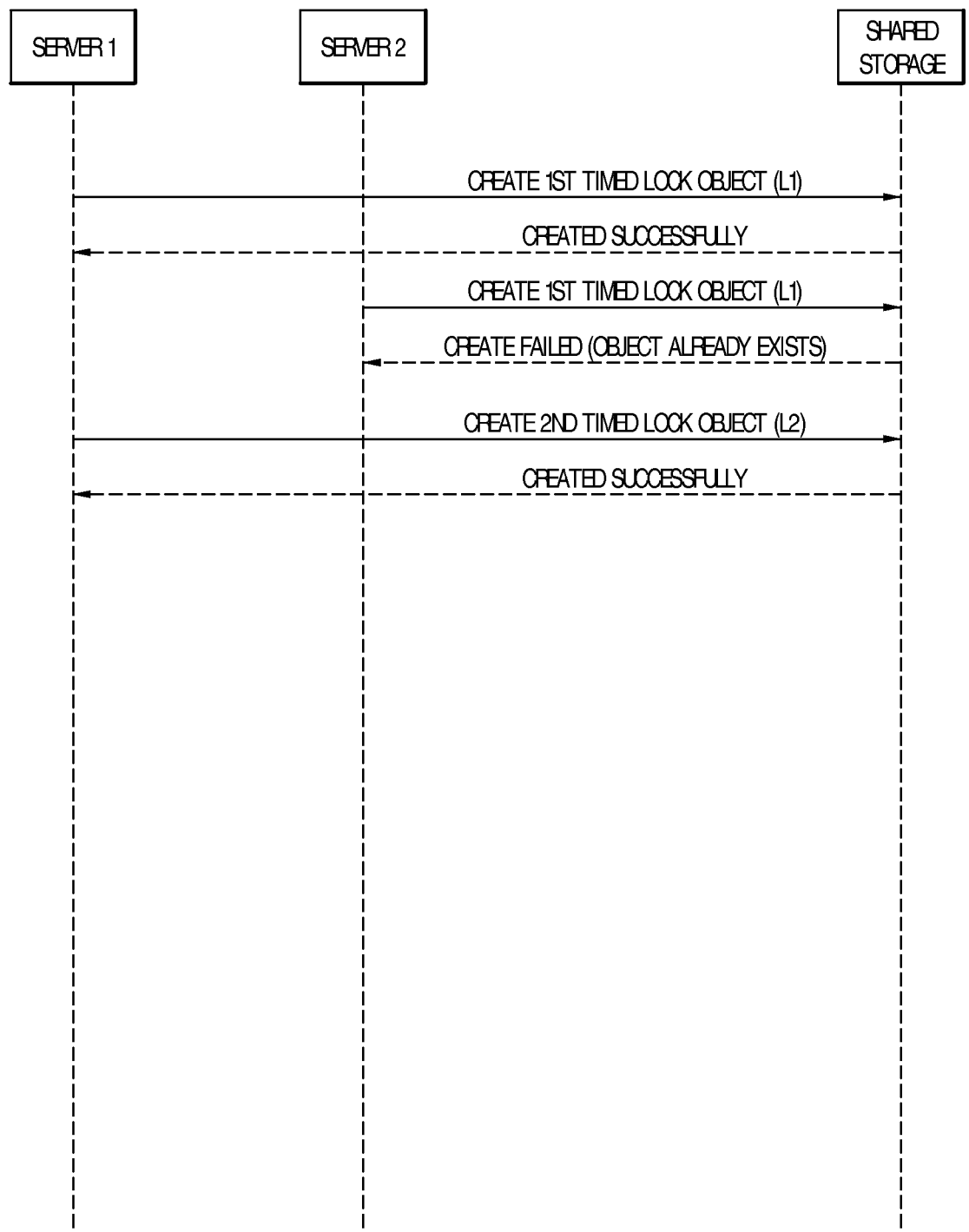
FIG. 5 illustrates a sequence diagram depicting a process for accessing a shared storage device implemented in the system of FIG. 4 according to an aspect of the disclosure.

Referring to FIG. 4, another scenario when server 1 and server 2 attempt to access the storage device is depicted. Referring to FIG. 5, a diagram depicts the operation sequence of server 1, server 2, and the storage device and may correspond to the system, as depicted in FIG. 4.

Server 1 may first attempt to access the storage device by executing storage device access process 100. Server 1 may obtain a first access time when server 1 begins to attempt to access the storage drive. Server 1 then may obtain a first time by rounding down from the first access time to a lower limit of a first time interval in which the first access time occurs. Server 1 may generate a first time-lock object L1 having a name of the first time. Server 1 may store first time-lock object L1 in the storage device, because no time-lock object having a name of the first time has been stored in the storage device yet.

Server 2 may attempt to access the storage device after server 1 stored first time-lock object L1 in the storage device. Server 2 may obtain a second access time when server 2 begins to attempt to access the storage device. The second access time may occur in the same first time interval. Server 2 may round down from the second access time to a lower limit of the first time interval and may generate a time-lock object having a name of the lower limit of the first time interval. Thus, the time-lock object generated by server 2 may be identical to first time-lock object L1 of server 1. Because first time-lock object L1 already is stored in the storage device by server 1, server 2 may be prevented from storing server 2's time-lock object, which may be identical to first time-lock object L1, in the storage device. Therefore, server 2 may be prevented from accessing the storage device.

Server 1 may then obtain a second time by rounding up from the first access time to an upper limit of the first time interval in which the first access time occurs. Server 1 may generate a second time-lock object L2 having a name of the second time. Because no time-lock object having a name of the second time has been stored in the storage device yet, server 1 may store second time-lock object L2 in the storage. Thus, server 1 may gain exclusive access to the storage device during time intervals associated with the first time and the second time.

Accordingly, server 1 may have exclusive access to the storage device during the time intervals associated with the first and the second time-locks. Server 2 may attempt to access the storage device after the first time interval after first and second time-lock objects L1 and L2 expire.

Figure 6:
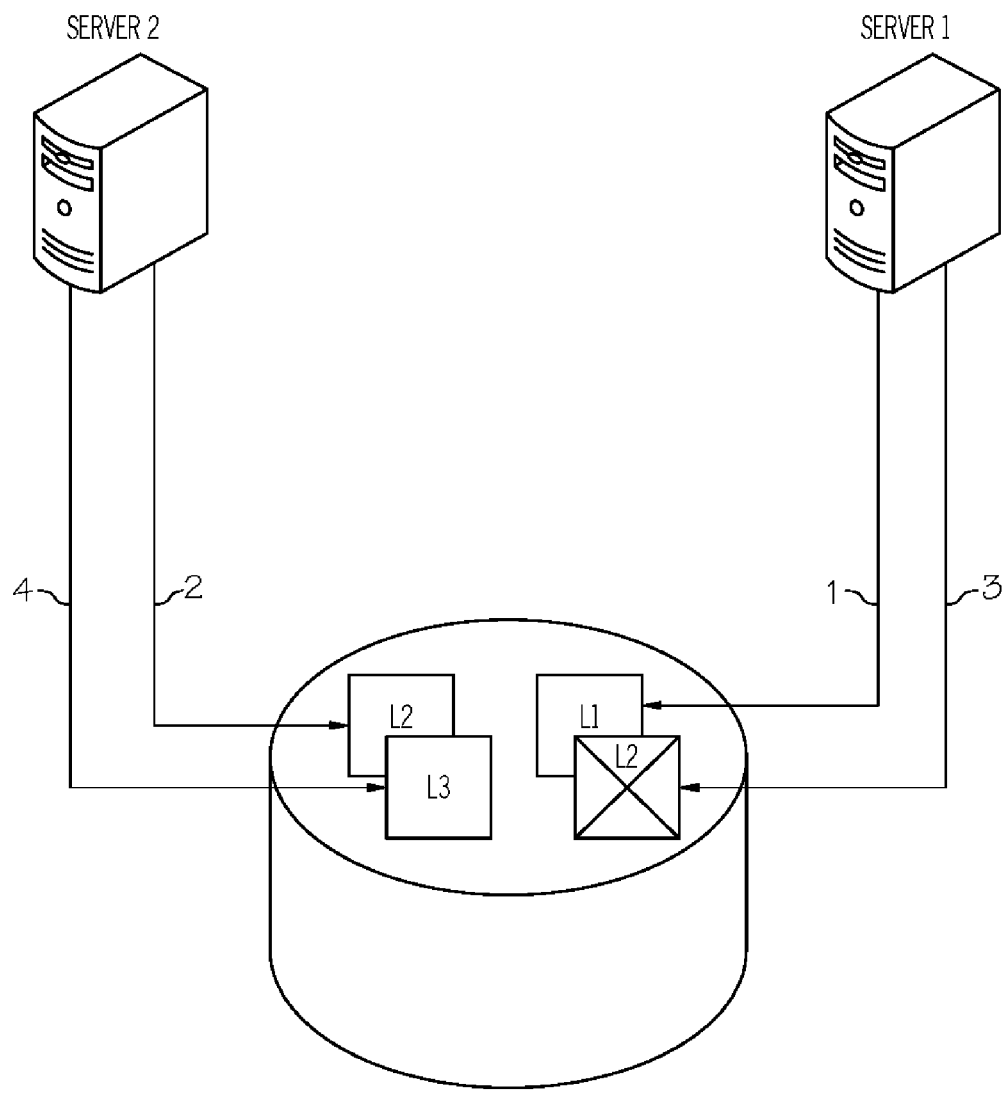
FIG. 6 illustrates yet another diagram depicting a system for accessing a shared storage device according to an aspect of the disclosure.
Figure 7:
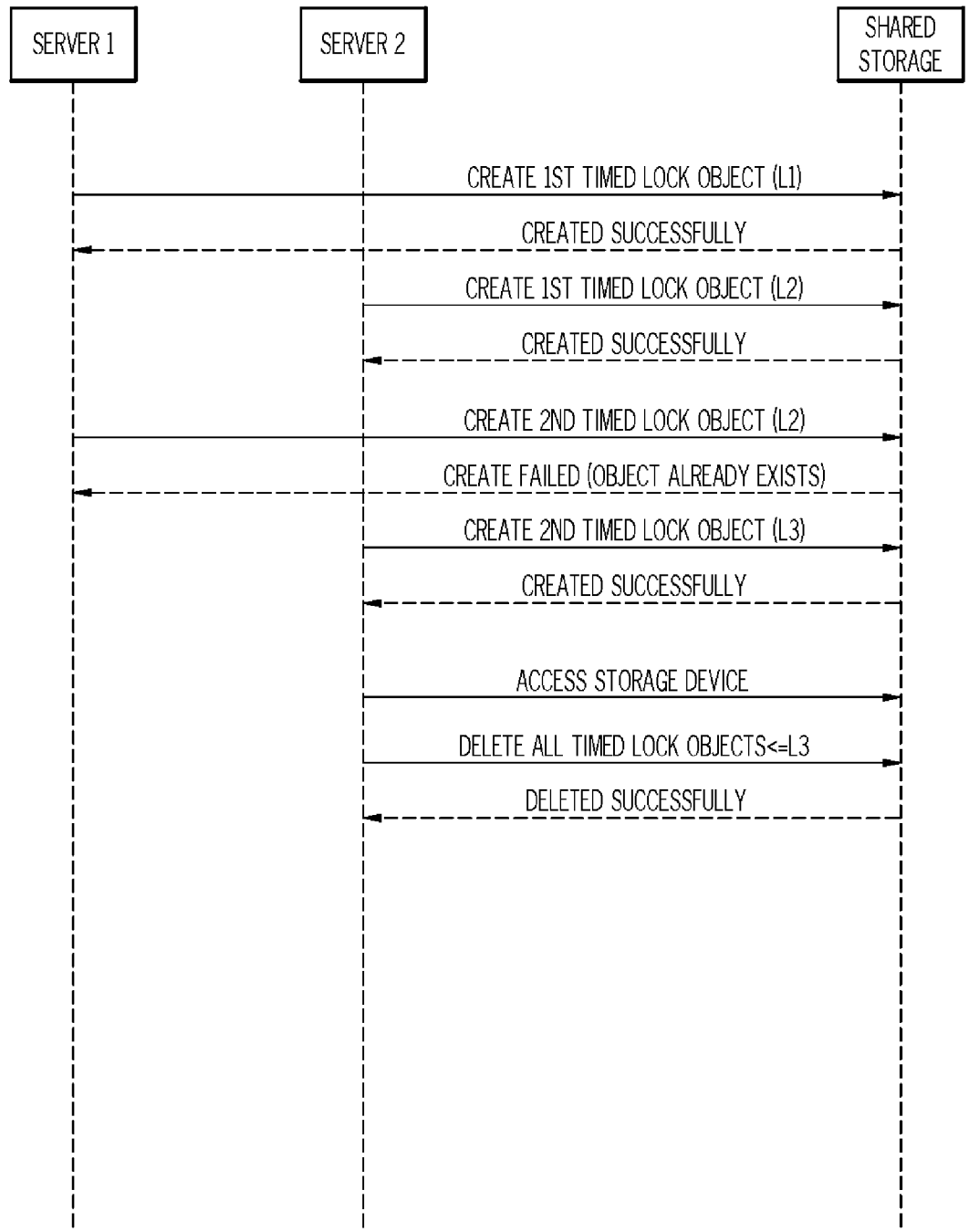
FIG. 7 illustrates a sequence diagram depicting a process for accessing a shared storage device implemented in the system of FIG. 6 according to an aspect of the disclosure.

Referring to FIG. 6, still another scenario when server 1 and server 2 attempt to access the storage device is depicted. Referring to FIG. 7, a diagram depicts the operation sequence of server 1, server 2, and the storage device and may correspond to the system, as depicted in FIG. 6.

Server 1 may first attempt to access the storage device by executing storage device access process 100. Server 1 may obtain a first access time when server 1 begins to attempt to access the storage drive. Server 1 then may obtain a first time by rounding down from the first access time to a lower limit of a first time interval in which the first access time occurs. Server 1 may generate a first time-lock object L1 having a name of the first time. Server 1 may store first time-lock object L1 in the storage device, because no time-lock object having a name of the first time has yet been stored in the storage device.

Server 2 may attempt to access the storage device after server 1 stored first time-lock object L1 in the storage device and before server 1 store another time-lock object in the storage device. Server 2 may obtain a second access time when server 2 begins to attempt to access the storage device. The second access time may occur in a second time interval subsequent to the first time interval. Server 2 may round down from the second access time to a lower limit of the second time interval and may generate a second time-lock object L2 having a name of the lower limit of the second time interval.

Server 1 may then round up from the first access time to generate a second time-lock object having a name of the upper limit of the first time interval. Because the second time interval may be immediate subsequent to the first time interval, the lower limit of the second time interval may be the same as the upper limit of the first time interval. Thus, the second time-lock object generated by server 1 may be identical to second time-lock object L2 generated by server 2. Because second time-lock object L2 already is stored in the storage device by server 2, server 1 may be prevented from storing the second time-lock object of server 1 in the storage device. Therefore, server 1 may be prevented from accessing the storage device.

Server 2 may then obtain a second time by rounding up from the second access time to an upper limit of the second time interval in which the second access time occurs. Server 2 next may generate a third time-lock object L3 having a name of the second time. Because no time-lock object having a name of the upper limit of the second time interval has been stored in the storage device yet, server 2 may store third time-lock object L3 in the storage. Thus, server 2 may gain exclusive access to the storage device during time intervals associated with the second and the third time-lock objects L2 and L3. Therefore, even though server 1 may attempt to access the storage device before server 2, server 2 may gain exclusive access to the storage device under this scenario. After server 2 finishes accessing the storage device and is ready to release the time-locks, time-lock objects L2 and L3 may be deleted from storage device, such that other servers may obtain access to the storage device.

TABLE B

| Access time Server 1 | Access time Server 2 | First time-lock name (Round down) | Second time-lock name (Round up) | Lock Duration assuming that server 1 obtains exclusive access privilege |
|---|---|---|---|---|
| 10:08:00 | 10:08:00 | 10:08:00 | 10:09:00 | 1:59 (10:08:00-10:09:59) |
| 10:08:01 | 10:08:01 | 10:08:00 | 10:09:00 | 1:58 (10:08:01-10:09:59) |
| 10:08:15 | 10:08:15 | 10:08:00 | 10:09:00 | 1:44 (10:08:15-10:09:59) |
| 10:08:30 | 10:08:30 | 10:08:00 | 10:09:00 | 1:29 (10:08:30-10:09:59) |
| 10:08:31 | 10:08:31 | 10:08:00 | 10:09:00 | 1:28 (10:08:31-10:09:59) |
| 10:08:45 | 10:08:45 | 10:08:00 | 10:09:00 | 1:14 (10:08:45-10:09:59) |
| 10:08:59 | 10:08:59 | 10:08:00 | 10:09:00 | 1:00 (10:08:59-10:09:59) |

Referring to Table C, as shown below, examples of various access times for server 1 and server 2 are listed. The examples listed in Table C may occur when the time difference between the internal clocks of server 1 and server 2 is one second, e.g., the internal clocks of server 1 and server 2 have a time offset of one second.

TABLE C

| | Server 1 | | | Server 2 | | |
|---|---|---|---|---|---|---|
| Access time Server 1 | First time-lock name (Round down from Server 1 access time) | Second time-lock name (Round up from Server 1 access time) | Access time Server 2 | First time-lock name (Round down from Server 2 access time) | Second time-lock name (Round up from Server 2 access time) | Lock Duration assuming that server 1 obtains exclusive access privilege |
| 10:08:00 | 10:08:00 | 10:09:00 | 10:08:01 | 10:08:00 | 10:09:00 | 1:58 (10:08:01-10:09:59) |
| 10:08:01 | 10:08:00 | 10:09:00 | 10:08:02 | 10:08:00 | 10:09:00 | 1:57 (10:08:02-10:09:59) |
| 10:08:15 | 10:08:00 | 10:09:00 | 10:08:16 | 10:08:00 | 10:09:00 | 1:43 (10:08:16-10:09:59) |
| 10:08:30 | 10:08:00 | 10:09:00 | 10:08:31 | 10:08:00 | 10:09:00 | 1:28 (10:08:31-10:09:59) |
| 10:08:31 | 10:08:00 | 10:09:00 | 10:08:32 | 10:08:00 | 10:09:00 | 1:27 (10:08:32-10:09:59) |
| 10:08:45 | 10:08:00 | 10:09:00 | 10:08:46 | 10:08:00 | 10:09:00 | 1:13 (10:08:46-10:09:59) |
| 10:08:59 | 10:08:00 | 10:09:00 | 10:09:00 | 10:09:00 | 10:10:00 | 0:59 (10:09:00-10:09:59) |

Referring to Table B, as shown below, examples of various access times for server 1 and server 2 are listed. The examples listed in Table B may be implemented when the time difference between the internal clocks of server 1 and server 2 is 0, e.g., the internal clocks of server 1 and server 2 are synchronized.

Referring to Table D, as shown below, examples of various access times for server 1 and server 2 are listed. The examples listed in Table D may occur when the time difference between the internal clocks of server 1 and server 2 is 59 seconds, e.g., the internal clocks of server 1 and server 2 have a time offset of 59 seconds.

TABLE D

| | Server 1 | | | Server 2 | | |
|---|---|---|---|---|---|---|
| Access time Server 1 | First time-lock name (Round down from Server 1 access time) | Second time-lock name (Round up from Server 1 access time) | Access time Server 2 | First time-lock name (Round down from Server 2 access time) | Second time-lock name (Round up from Server 2 access time) | Lock Duration assuming that server 1 obtains exclusive access privilege |
| 10:08:00 | 10:08:00 | 10:09:00 | 10:08:59 | 10:08:00 | 10:09:00 | 1:00 (10:08:59-10:09:59) |
| 10:08:01 | 10:08:00 | 10:09:00 | 10:09:00 | 10:09:00 | 10:10:00 | 0:59 (10:09:00-10:09:59) |
| 10:08:15 | 10:08:00 | 10:09:00 | 10:09:14 | 10:09:00 | 10:10:00 | 0:45 (10:09:14-10:09:59) |
| 10:08:30 | 10:08:00 | 10:09:00 | 10:09:29 | 10:09:00 | 10:10:00 | 0:30 (10:09:29-10:09:59) |

TABLE D-continued

| Server 1 | | | Server 2 | | | |
| --- | --- | --- | --- | --- | --- | --- |
| Access time Server 1 | First time-lock name (Round down from Server 1 access time) | Second time-lock name (Round up from Server 1 access time) | Access time Server 2 | First time-lock name (Round down from Server 2 access time) | Second time-lock name (Round up from Server 2 access time) | Lock Duration assuming that server 1 obtains exclusive access privilege |
| 10:08:31 | 10:08:00 | 10:09:00 | 10:09:30 | 10:09:00 | 10:10:00 | 0:29 (10:09:30-10:09:59) |
| 10:08:45 | 10:08:00 | 10:09:00 | 10:09:44 | 10:09:00 | 10:10:00 | 0:15 (10:09:44-10:09:59) |
| 10:08:59 | 10:08:00 | 10:09:00 | 10:09:58 | 10:09:00 | 10:10:00 | 0:01 (10:10:58-10:09:59) |

Accordingly, regardless of the order of access to the storage device by the servers, storage device access process 100 may ensure that one server has exclusive access to the storage device during a time interval and may prevent other servers from accessing the storage device during the time interval. By using two time-locks, storage device access process 100 may mitigate time skews among the internal clocks of the computers and the storage device. The time-locks may be self expiring, such that, if a computer holding exclusive access to the storage device fails, the exclusive access to the storage device automatically may be surrendered when the time-locks expire. Thus, the storage device may not be locked up indefinitely by a failed computer and another computer may acquire exclusive access after the time-locks self-expire.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer configured to access a storage device, the computer comprising:
   a processor; and
   a non-transitory, computer-readable storage medium storing computer-readable instructions when executed by the processor cause the computer to perform:
   storing a first time-lock and a second time-lock in the storage device, wherein storing the first and second time-locks in the storage device comprises:
      determining an access time at which the computer attempts to access the storage device;
      determining a first time by rounding down from the access time to a lower limit within the time interval;
      generating a first object including data indicating the first time; and
   when both the first time-lock and the second time-lock are successfully stored in the storage device by the computer, obtaining an exclusive access privilege during a particular time interval associated with the first time-lock and the second time-lock.

2. The computer of claim 1, wherein storing the first and second time-locks in the storage device comprises:
   when an object including the first time is not stored in the storage device, storing the first object as the first time-lock in the storage device;
   determining a second time by rounding up from the access time to an upper limit within the time interval;
   generating a second object comprising data indicating the second time; and
   when an object comprising the second time is not stored in the storage device, storing the second object as the second time-lock in the storage device.

3. The computer of claim 1, wherein the computer-readable instructions when executed by the processor cause the computer to further perform:
   refraining from obtaining the exclusive access privilege during the particular time interval associated with the first time-lock and the second time-lock when at least one of the first time-lock and the second time-lock is not stored in the storage device successfully by the computer.

4. The computer of claim 1, wherein the computer-readable instructions when executed by the processor cause the computer to further perform:

maintaining the exclusive access privilege in a subsequent time interval after the particular time interval by storing a third time-lock in the storage device subsequent to the second time-lock.

5. The computer of claim 1, wherein the computer-readable instructions when executed by the processor cause the computer to further perform:

maintaining the exclusive access privilege in a subsequent time interval after the particular time interval by storing and updating a keep-alive object.

6. The computer of claim 1, wherein the exclusive access privilege comprises exclusive access to modify data stored in the storage device.

7. The computer of claim 1, wherein the exclusive access privilege comprises exclusive access to control an operation of the storage device.

8. The computer of claim 1, wherein the exclusive access privilege comprises exclusive access to another device.

9. The computer of claim 1, wherein the exclusive access privilege comprises exclusive access to an operation in another device.

10. A method for accessing a storage device comprising:
storing a first time-lock and a second time-lock in the storage device, wherein storing a first time-lock and a second time-lock in the storage device comprises:
determining an access time at which the computer attempts to access the storage device;
determining a first time by rounding down from the access time to a lower limit within the time interval;
generating a first object comprising data indicating the first time; and
when both the first time-lock and the second time-lock are successfully stored in the storage device by the computer, obtaining an exclusive access privilege during a particular time interval associated with the first time-lock and the second time-lock.

11. The method of claim 10, wherein storing the first and second time-locks in the storage device comprises:
when an object comprising the first time is not stored in the storage device, store the first object as the first time-lock in the storage device;
determining a second time by rounding up from the access time to an upper limit within the time interval;
generating a second object comprising data indicating the second time; and
when an object comprising the second time is not stored in the storage device, store the second object as the second time-lock in the storage device.

12. The method of claim 10 further comprising:
refraining from obtaining the exclusive access privilege during the particular time interval associated with the first time-lock and the second time-lock when at least one of the first time-lock and the second time-lock is not stored in the storage device successfully by the computer.

13. The method of claim 10 further comprising:
maintaining the exclusive access privilege in a subsequent time interval after the particular time interval by storing a third time-lock in the storage device subsequent to the second time-lock.

14. The method of claim 10 further comprising:
maintaining the exclusive access privilege in a subsequent time interval after the particular time interval by storing and updating a keep-alive object.

15. The method of claim 10, wherein the exclusive access privilege comprises exclusive access to modify data stored in the storage device.

16. The method of claim 10, wherein the exclusive access privilege comprises exclusive access to control an operation of the storage device.

17. The method of claim 10, wherein the exclusive access privilege comprises exclusive access to another device.

18. The method of claim 10, wherein the exclusive access privilege comprises exclusive access to an operation in another device.

19. A computer program product comprising:
a non-transitory computer readable storage medium having computer readable program code embodied therewith, the computer readable program code comprising:
computer readable program code to store a first time-lock and a second time-lock in the storage device, wherein the computer readable program code to store a first time-lock and a second time-lock in the storage device further comprises:
computer readable program code to determine an access time at which the computer attempts to access the storage device;
computer readable program code to determine a first time by rounding down from the access time to a lower limit within the time interval;
computer readable program code to generate a first object comprising data indicating the first time; and
computer readable program code to, when both the first time-lock and the second time-lock are successfully stored in the storage device by the computer, obtaining an exclusive access privilege during a particular time interval associated with the first time-lock and the second time-lock.

* * * * *